United States Patent
Nießner et al.

(10) Patent No.: US 11,676,408 B2
(45) Date of Patent: *Jun. 13, 2023

(54) IDENTIFICATION OF NEURAL-NETWORK-GENERATED FAKE IMAGES

(71) Applicant: Artificial Intelligence Foundation, Inc., Las Vegas, NV (US)

(72) Inventors: Matthias Nießner, Munich (DE); Gaurav Bharaj, Jersey City, NJ (US)

(73) Assignee: Artificial Intelligence Foundation, Inc., Las Vegas, NV (US)

(*) Notice: Subject to any disclaimer, the term of this patent is extended or adjusted under 35 U.S.C. 154(b) by 166 days.

This patent is subject to a terminal disclaimer.

(21) Appl. No.: 17/182,250

(22) Filed: Feb. 23, 2021

(65) Prior Publication Data
US 2021/0174487 A1 Jun. 10, 2021

Related U.S. Application Data

(63) Continuation of application No. 16/686,088, filed on Nov. 15, 2019, now Pat. No. 10,964,006.

(Continued)

(51) Int. Cl.
*G06K 9/00* (2022.01)
*G06V 20/80* (2022.01)
(Continued)

(52) U.S. Cl.
CPC ............ *G06V 20/80* (2022.01); *G06T 7/0002* (2013.01); *G06V 10/431* (2022.01); *G06V 10/44* (2022.01); *G06V 10/454* (2022.01); *G06V 10/462* (2022.01); *G06V 10/764* (2022.01); *G06V 10/7715* (2022.01); *G06V 10/82* (2022.01); *G06V 20/00* (2022.01); *G06T 2207/10016* (2013.01); *G06T 2207/20081* (2013.01); *G06T 2207/20084* (2013.01)

(58) Field of Classification Search
CPC ......... G06T 7/0002; G06T 2207/10016; G06T 2207/20081; G06T 2207/20084
USPC ........................................................ 382/157
See application file for complete search history.

(56) References Cited

PUBLICATIONS

Li, Yuezun, and Siwei Lyu. "Exposing deepfake videos by detecting face warping artifacts." arXiv preprint arXiv:1811.00656 (2018). (Year: 2018).*

(Continued)

*Primary Examiner* — Jonathan S Lee
(74) *Attorney, Agent, or Firm* — Steven Stupp (57) ABSTRACT

A computer that identifies a fake image is described. During operation, the computer receives an image. Then, the computer performs analysis on the image to determine a signature that includes multiple features. Based at least in part in the determined signature, the computer classifies the image as having a first signature associated with the fake image or as having a second signature associated with a real image, where the first signature corresponds to a finite resolution of a neural network that generated the fake image, a finite number of parameters in the neural network that generated the fake image, or both. For example, the finite resolution may correspond to floating point operations in the neural network. Moreover, in response to the classification, the computer may perform a remedial action, such as providing a warning or a recommendation, or performing filtering.

20 Claims, 6 Drawing Sheets

Related U.S. Application Data

(60) Provisional application No. 62/768,104, filed on Nov. 16, 2018.

(51) Int. Cl.
  *G06T 7/00* (2017.01)
  *G06V 10/42* (2022.01)
  *G06V 10/764* (2022.01)
  *G06V 10/77* (2022.01)
  *G06V 10/82* (2022.01)
  *G06V 10/44* (2022.01)
  *G06V 10/46* (2022.01)
  *G06V 20/00* (2022.01)

(56) References Cited

PUBLICATIONS

Tariq, Shahroz, et al. "Detecting both machine and human created fake face images in the wild." Proceedings of the 2nd international workshop on multimedia privacy and security. 2018. (Year: 2018).*

* cited by examiner

IDENTIFICATION OF NEURAL-NETWORK-GENERATED FAKE IMAGES

CROSS-REFERENCE TO RELATED APPLICATION

This application is a continuation of U.S. patent application Ser. No. 16/686,088, "Identification of Neural-Network-Generated Fake Images," by Matthias Nießner, et al., filed on Nov. 15, 2019, which claims priority under 35 U.S.C. 119(e) to U.S. Provisional Application No. 62/768,104, entitled "Identification of Neural-Network-Generated Fake Images," by Matthias Nießner, filed Nov. 16, 2018, the contents of both of which are hereby incorporated by reference.

FIELD

The described embodiments relate to techniques for identifying one or more fake images (such as a video) that were generated using a neural network.

BACKGROUND

People often consider images to be the gold standard of proof or evidence about events. This preference for visual evidence is no doubt influenced by significant cognitive capabilities of humans for analyzing and interpreting visual information. Consequently, for many people, seeing quite literally is believing.

Central to this belief is the trust that images are authentic. However, recent technical advances are allowing malicious parties to generate increasingly realistic fake images and videos, and to do so in near real time. Moreover, in conjunction with widely available networks and online platforms (such as social networks), it is now possible for such fake images and videos to be rapidly disseminated.

If unchecked, the advent of widely viewed realistic fake images and videos poses a threat to the reputations of individuals (e.g., celebrities), companies and governments. Indeed, such forgeries can undermine people's shared sense of objective reality, with commensurate political and social consequences.

SUMMARY

A computer that identifies a fake image is described. During operation, the computer receives an image. Then, the computer performs analysis on the image to determine a signature that includes multiple features. Based at least in part in the determined signature, the computer classifies the image as having a first signature associated with the fake image or as having a second signature associated with a real image, where the first signature corresponds to a finite resolution of a neural network that generated the fake image, a finite number of parameters in the neural network that generated the fake image, or both. For example, the finite resolution may correspond to floating point operations in the neural network. Alternatively or additionally, the first signature may correspond to differences between the image and, given locations of one or more light sources and one or more objects in the image, predictions of a physics-based rendering technique.

In some embodiments, the computer includes a computation device (such as a processor, a processor core, a graphics processing unit, etc.) and a memory that stores program instructions.

Note that the computer may implement a second neural network that performs the analysis to determine the signature, and that classifies the image. For example, the second neural network may include a generative adversarial network (GAN). In some embodiments, a magnification of the image during the classification may be based at least in part on how long the neural network was trained.

Moreover, the image may include a video. Note that the first signature may be associated with a noise property of a shadow region located proximate to and at a former position of a moving object in a sequence of images in the video. For example, the noise property may include a speckled pattern of greyscale values in the shadow region in a given image in the sequence of images in the video.

Furthermore, the analysis may include at least one of a discrete Fourier transform, principal component analysis or a Joint Photographic Experts Group (JPEG) analysis. More generally, the analysis may include a feature extraction technique that determines a group of basis features. Then, the computer may select a subset of the basis features, which spans a space that includes the first signature and the second signature.

Additionally, the classification may be performed using a classifier that was trained using a supervised learning technique and a training dataset with predefined signatures, including the first signature and the second signature.

In some embodiments, the computer is trained using images that were classified using, e.g., an unsupervised learning technique.

Moreover, based at least in part on the classification, the computer may selectively perform a remedial action. For example, the computer may provide a warning or a recommendation associated with the image. Alternatively or additionally, the computer may delete or block access to the image or at least a portion of the content in the image. In some embodiments, the computer filters at least the portion of the content in the image.

Another embodiment provides a computer-readable storage medium for use in conjunction with the computer. This computer-readable storage medium includes the program instructions for at least some of the operations performed by the computer.

Another embodiment provides a method for identifying a fake image. The method includes at least some of the aforementioned operations performed by the computer.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

A computer that identifies one or more fake images is described. During operation, the computer receives an image. Then, the computer performs analysis on the image to determine a signature that includes multiple features. Based at least in part in the determined signature, the computer classifies the image as having a first signature associated with the fake image or as having a second signature associated with a real image, where the first signature corresponds to a finite resolution of a neural network that generated the fake image, a finite number of parameters in the neural network that generated the fake image, or both. For example, the finite resolution may correspond to floating point operations in the neural network. Moreover, in response to the classification, the computer may perform a remedial action, such as providing a warning or a recommendation, or performing filtering (e.g., not displaying the image or at least some of the content in the image).

By identifying a fake image, the image analysis techniques may reduce or prevent intentional attempts at disseminating misleading, inaccurate or false information. Moreover, in the process, the image analysis techniques may help maintain people's belief that visual information is reliable and trustworthy. Furthermore, by helping to ensure that images and videos are authentic, the image analysis techniques may preserve people's shared sense of objective reality, and thus may help prevent adverse social and political impacts. Consequently, the image analysis techniques may provide an improved user experience when viewing images and videos.

In the discussion that follows, an individual or a user may be a person. In some embodiments, the image analysis techniques are used by a type of organization instead of a user, such as a business (which should be understood to include a for-profit corporation, a non-profit corporation or another type of business entity), a group (or a cohort) of individuals, a sole proprietorship, a government agency, a partnership, etc.

Moreover, in the following discussion, an image may include one or more of: a two-dimensional (2D) image, a 2.5D image, a 3D image (e.g., with stereoscopic information or a hologram), etc. Furthermore, an image may be compatible with a wide variety of different resolutions and/or file formats, such as one or more of: a JPEG or JPEG File Interchange format, JPEG 2000, an Exchangeable image file format (Exif), a Tagged Image File Format (TIFF), a Graphics Interchange Format (GIF), a bitmap file format (such as BMP), a Portable Network Graphics (PNG) file format, a Netpbm format, a WebP format, a Better Portable Graphics (BPG) format, a Photoshop file format (from Adobe Systems of San Jose, Calif.), a High Efficiency Image File Format (HEIF) and/or another image file format. Alternatively or additionally, in embodiments where the image includes a video, the video may be compatible with a variety of different resolutions and/or file formats, such as one or more of: an Audio Video Interleave (AVI) format, a Flash Video Format (FVF or SWF), a Windows Media Video (WMV), a Quick Time video format, Moving Pictures Expert Group 4 (MPEG 4 or MP4), an MOV format, a matroska (MKV) format, an advanced vide coding, high definition (AVCHD) format, and/or another video file format.

Additionally, in the discussion that follows, electronic devices and/or components in the computer (or a computer system) may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth™ (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet, a cellular-telephone communication protocol and/or Wi-Fi are used as illustrative examples.

Figure 1:
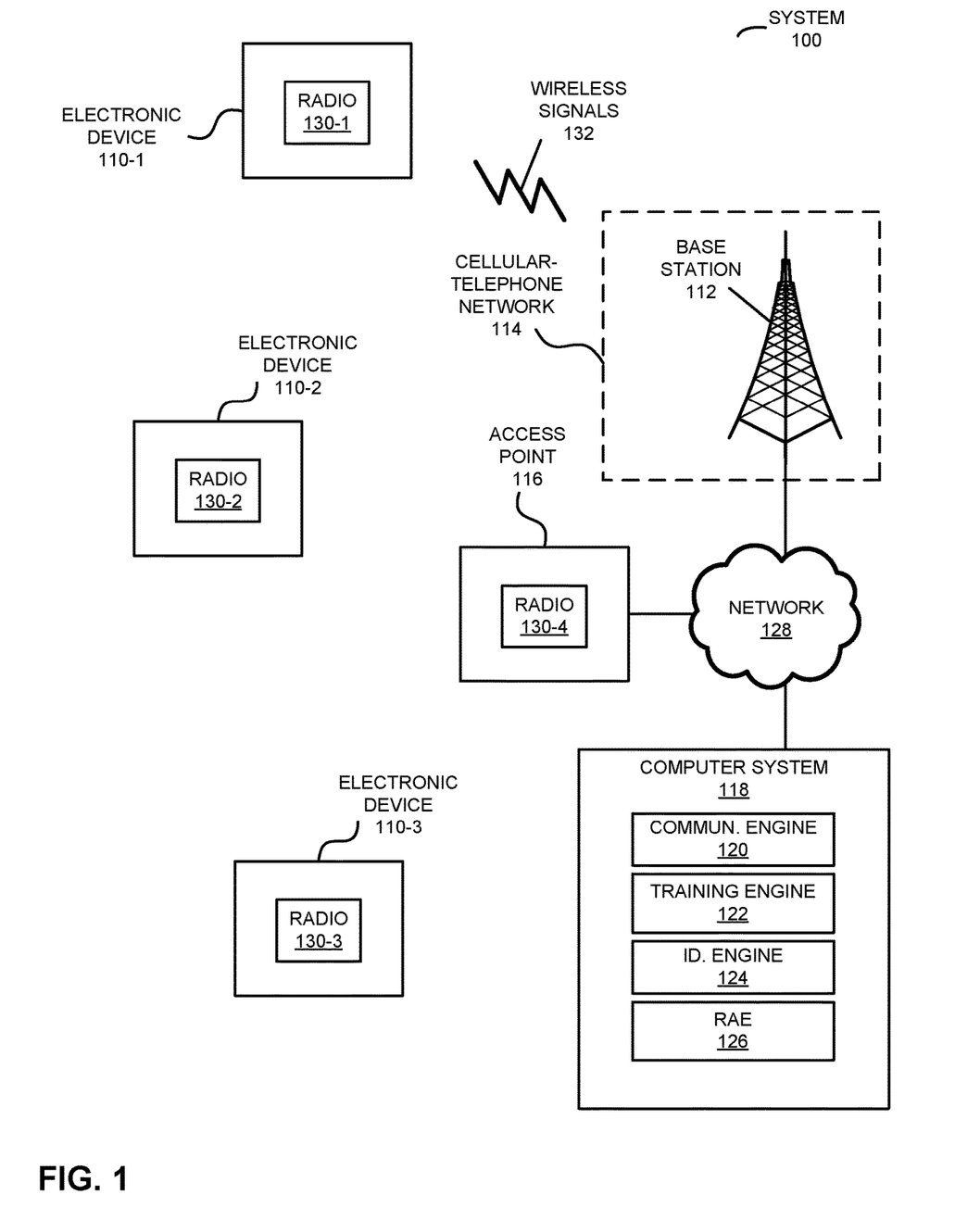
FIG. 1 is a block diagram illustrating a system that identifies fake images in accordance with an embodiment of the present disclosure.

Communication among electronic devices is shown in FIG. 1, which presents a block diagram illustrating a system 100 that identifies a fake image. In the following discussion, a 'fake' image or video may include a file with pixel values (color or black and white) that is computer generated or modified. Moreover, a 'fake' image or video may not correspond to real or actual events, or may not faithfully or accurately portray real events. Consequently, a 'fake' image or video may be designed or intended to mislead, deceive or confuse a viewer.

System 100 may include: one or more electronic devices 110 (such as one or more computers and/or one or more portable electronic devices, e.g., one or more cellular telephones), optional base station 112 in cellular-telephone network 114, optional access point 116 (such as a physical access point or a virtual access point that is implemented using software), and/or a computer system 118 (such as a computer or a server), which are sometimes collectively referred to as 'components' in system 100. Moreover, computer system 118 may include: communication engine 120 (or module), training engine 122 (or module), identification (ID) engine 124 (or module), and/or remedial action engine (RAE) 126 (or module).

Note that components in system 100 may communicate with each other via a network 128, such as the Internet, a cellular-telephone network (such as cellular-telephone network 114) and/or a wireless local area network (WLAN). Thus, the communication may involve wired and/or wireless communication. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets.

Figure 5:
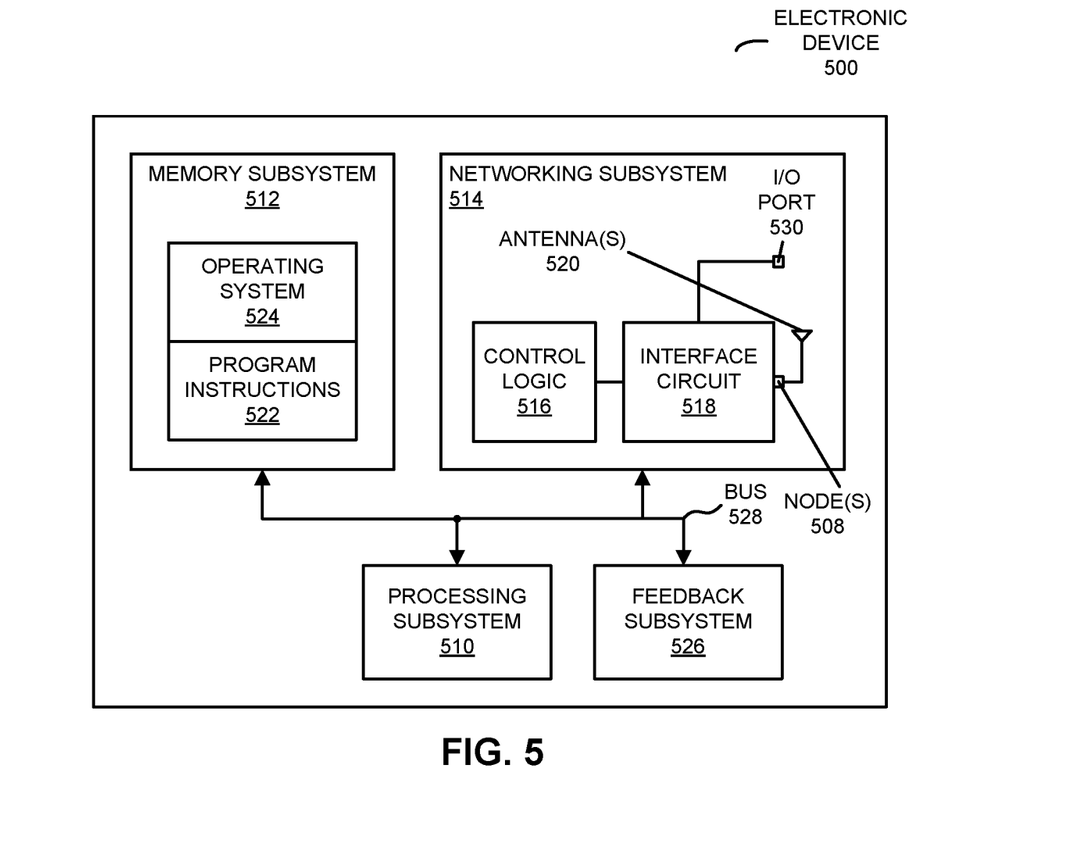
FIG. 5 is a block diagram illustrating an electronic device in accordance with an embodiment of the present disclosure.

As described further below with reference to FIG. 5, the one or more electronic devices 110, the optional base station 112, the optional access point 116 and/or computer system 118 may include subsystems, such as a networking subsystem, a memory subsystem and a processor subsystem. In addition, the one or more electronic devices 110, the optional base station 112, the optional access point 116 and/or computer system 118 may include radios 130 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 132 (represented by a jagged line) are transmitted by radios 130 in the components. For example, radio 130-1 in electronic device 110-1 may transmit information (such as packets) using wireless signals. These wireless signals may be received by radios 130 in one or more of the other components, such as by optional base station 112 or optional access point 116. This may allow electronic device 110-1 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame.

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, recent technical advances are allowing malicious parties to generate increasingly realistic fake images and videos. In order to address this problem, the image analysis techniques may be implemented by one or more components in system 100 to identify a fake image or a fake video. For example, the image analysis techniques may be implemented on a given electronic device (such as electronic device 110-1) and/or on computer system 118, i.e., in a distributed or a centralized manner. Notably, in some embodiments, the image analysis techniques may be implemented using program instructions or software that is executed in an environment on electronic device 110-1, such as an application executed in the operating system of electronic device 110-1, as a plugin for a Web bowser or an application tool that is embedded in a web page and that executes in a virtual environment of the Web browser (e.g., in a client-server architecture). Note that the software may be a standalone application or a portion of another application that is resident on and that executes on electronic device 110-1 (such as a software application that is provided by electronic device 110-1 or that is installed on and that executes on electronic device 110-1). When an image or a video is received or accessed by electronic device 110-1 (such as when a user of electronic device navigates to a Web page that includes an image or a video), the software may determine whether or not the image or video is likely to be real or fake, and then may perform a remedial action (such as providing a visual indication, alert or notification that indicates how trustworthy the image or video is, e.g., when the image or video is deemed to be fake, or that blocks or filters out suspect images or videos or suspect content in images or videos).

Alternatively, in some embodiments, when an image or a video is received or accessed by electronic device 110-1, software executing in an environment on electronic device 110-1 may upload or provide the image or video, via network 128 (such as cellular-telephone network 114, a WLAN and/or the Internet), to computer system 118. Then, as described further below, computer system 118 may perform the image analysis techniques and may provide feedback to electronic device 110-1 via network 128. This feedback may include information that specifies whether or not the image or video is likely to be real or fake, and may provide a recommendation for a remedial action. For example, the remedial action may include displaying a graphical icon or color corresponding to the trustworthiness of the image or video (such as green for likely real, yellow for possibly suspect, and red for likely fake). In some embodiments, the recommended remedial action may include blocking or not displaying the image or video (or a suspect portion of the image or video), such as when a user is viewing or interacting with a web page.

Thus, the image analysis techniques may be implemented locally and/or remotely in system 100. In the discussion that follows, a remote and centralized implementation on computer system 118 is used as an illustrative example of the image analysis techniques. Moreover, in the discussion that follows, a video (or a temporal sequence of images) is used as an illustrative example.

In these embodiments, as described further below with reference to FIGS. 2-4, communication engine 120 may receive the video from electronic device 110-1. Then, identification engine 124 may perform analysis and classification of the video. Notably, identification engine 124 may determine a signature that includes multiple features. Based at least in part in the determined signature, identification engine 124 may classify the image as having a first signature associated with the fake image or as having a second signature associated with a real image, where the first signature corresponds to a finite resolution of a neural network that generated the fake image, a finite number of parameters in the neural network that generated the fake image, or both. For example, the finite resolution may correspond to floating point operations in the neural network. Alternatively or additionally, the first signature may correspond to differences between the image and, given locations of one or more light sources and one or more objects in the image, predictions of a physics-based rendering technique. Note that, in the present and subsequent discussion, 'classification' should be understood to mean providing a discrete or a continuous output value (such as a greyscale value). Thus, 'classification' may involve the use of a classifier or a regression model and a threshold for deciding whether a given image or video is real or fake.

In some embodiments, identification engine 124 may implement a second neural network that performs the analysis to determine the signature, and that classifies the image. For example, the second neural network may include a GAN, a convolutional neural network and/or a recurrent neural network. For example, with a GAN, an adversarial feedback between a generator and a discriminator may be used to identify a fake image or a fake video. Furthermore, a magnification of the image during the analysis and/or the classification may be based at least in part on how long the neural network was trained.

Alternatively or additionally, identification engine 124 may perform a feature extraction technique on the image to determine a group of basis features. For example, the feature extraction technique may include: a discrete Fourier transform, principal component analysis and/or JPEG (or compression) analysis. In some embodiments, the feature extraction technique includes one or more of: an edge or a line-segment detector (such as a Sobel-Feldman operator or Sobel Filter), a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a histogram of oriented gradients (HOG), a features from accelerated segment test (FAST) detector, a motion detector (such as a Gaussian-mixture model), etc. After the group of basis features is determined, identification engine 124 may select a subset of the basis features, which spans a space that includes the first signature and the second signature. Note that the selected subset of the basis features may provide a latent space with a common basis for the first signature and the second signature.

Moreover, the image may include a video. As described further below with reference to FIG. 4, in these embodiments the first signature may be associated with a noise property of a shadow region located proximate to and at a former position of a moving object in a sequence of images in the video. For example, the noise property may include a speckled pattern of greyscale values in the shadow region in a given image in the sequence of images in the video.

Next, remedial action engine 126 may selectively perform a remedial action based at least in part on the classification performed by identification engine 124. For example, remedial action engine 126 may provide, via network 128, a warning or a recommendation associated with the image to electronic device 110-1. In response, electronic device 110-1 may display the warning or the recommendation. Alternatively or additionally, remedial action engine 126 may delete or block access to the image or at least a portion of the content in the image (or provides, via network 128, instructions to electronic device 110-1 to delete or block access to the image or at least a portion of the content in the image). In some embodiments, remedial action engine 126 filters at least the portion of the content in the image.

Prior to analyzing and classifying the image, software in computer system 100 (such as the second neural network) may be trained by training engine 122 (such as using gradient descent optimization). For example, the classification by identification engine 124 may be performed using a classifier or a regression model that was trained using a supervised learning technique (such as a support vector machine, a classification and regression tree, logistic regression, LASSO, linear regression and/or another linear or nonlinear supervised-learning technique) and a training dataset with predefined signatures, including the first signature and the second signature. This classifier may implement one or more filters based at least in part on predefined or predetermined signatures, such as the first signature and the second signature. Alternatively or additionally, training engine 122 may train identification engine 124 using images that were classified as real or fake using, e.g., an unsupervised learning technique (such as a clustering technique).

In some embodiments, via communication engine 120, a user or operator of computer system 118 may provide feedback to computer system 118 about the performance of the classification of images or videos. In these embodiments, remedial action engine 126 may use this feedback to automatically perform reinforced learning on the classifier or may generate a revised classifier. Consequently, the image analysis techniques may allow closed-loop adaptation of the classifier. Note that the adaptation based at least in part on user feedback may be performed: continuously, periodically or as needed (such as depending on the performance, e.g., the accuracy, of the identification of fake images and/or fake videos). In these ways, the accuracy of the image analysis techniques may be improved, so that, over time, the accuracy is improved to better than 80, 90, 95 or 99%.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
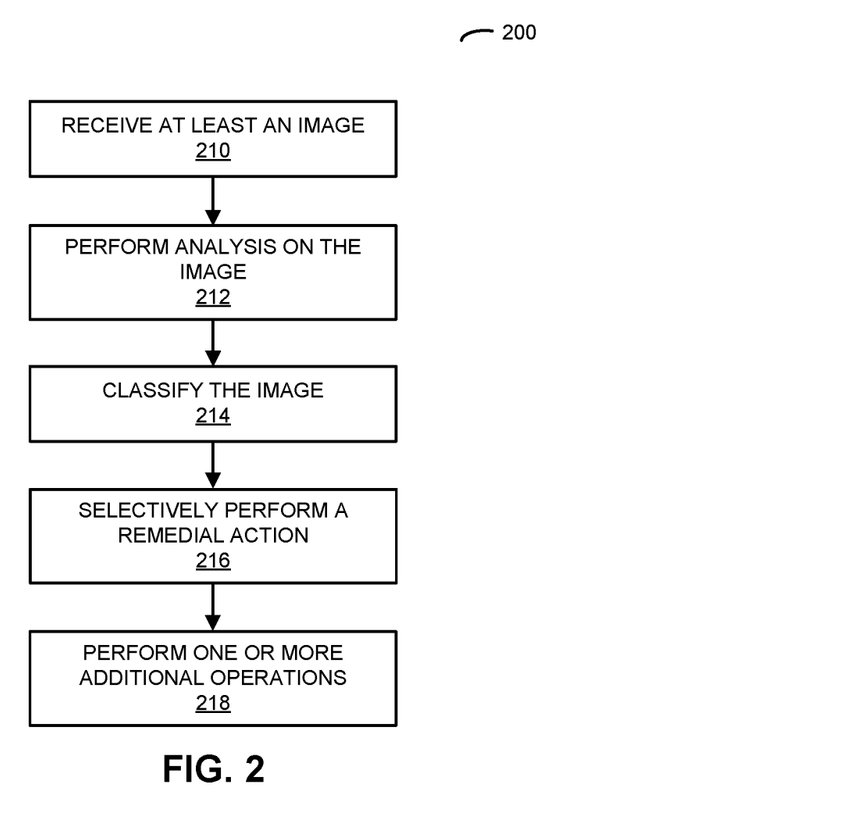
FIG. 2 is a flow diagram illustrating a method for identifying fake images in accordance with an embodiment of the present disclosure.

FIG. 2 presents embodiments of a flow diagram illustrating method 200 for identifying a fake image, which may be performed by a computer (such as computer system 118 in FIG. 1). Notably, the computer may include a computation device that performs method 200. For example, the computation device may include one or more of: a processor, one or more cores in a second processor, or another type of device that performs computation (such as one or more GPUs, which may implement a neural network).

During operation, the computer may receive at least an image (operation 210). For example, the image may be provided to the computer, or the computer may access the image in a computer-readable memory.

Then, the computer may perform analysis on the image (operation 212) to determine a signature that includes multiple features.

Based at least in part in the determined signature, the computer may classify the image (operation 214) as having a first signature associated with the fake image or as having a second signature associated with a real image, where the first signature corresponds to a finite resolution of a neural network that generated the fake image, a finite number of parameters in the neural network that generated the fake image, or both. For example, the finite resolution may correspond to floating point operations in the neural network.

Alternatively or additionally, the first signature may correspond to differences between the image and, given locations of one or more light sources and one or more objects in the image, predictions of a physics-based rendering technique. For example, the analysis (and, thus, the determined signature) may include or may be based at least in part on one or more of: a location of a given light source, a signal-to-noise ratio of information in the image, a histogram of the light intensity in the image, an estimated or predefined f-number of an image sensor that acquired the image, another metric of the light intensity in the image, and/or another image-quality metric of the image. Therefore, the first signature may include inconsistencies (between predictions by the physics or geometric-optics-based rendering technique and the image) in one or more of: shadows in the image, reflections in the image, perspective in the image, monoscopic depth cues, stereoscopic information (when the image includes 3D information), etc.

In some embodiments, the image may include a video. Moreover, the first signature may be associated with a noise property of a shadow region located proximate to and at a former position of a moving object in a sequence of images in the video. For example, the noise property may include a speckled pattern of greyscale values in the shadow region in a given image.

Next, based at least in part on the classification, the computer may selectively perform a remedial action (operation 216). For example, the computer may provide a warning or a recommendation associated with the image. Alternatively or additionally, the computer may delete or block access to the image or at least a portion of the content in the image. In some embodiments, the computer filters at least the portion of the content in the image.

Note that the computer may implement a second neural network that performs the analysis to determine the signature, and that classifies the image. For example, the second neural network may include a GAN, a convolutional neural network and/or a recurrent neural network. In some embodiments, a magnification of the image during the analysis (operation 212) and/or the classification (operation 214) may be based at least in part on how long the neural network was trained.

Alternatively or additionally, the analysis (operation 212) may include at least one of a discrete Fourier transform, principal component analysis or a JPEG analysis. More generally, the analysis may include a feature extraction technique that determines a group of basis features. Then, the computer may select a subset of the basis features (such as relevant eigenvectors), which spans a space that includes the first signature and the second signature, and thus allows discrimination of fake or synthetic images from real images.

In some embodiments, the computer optionally performs one or more additional operations (operation 218). For example, the computer may train a classifier that performs the classification using a supervised learning technique and a training dataset with predefined signatures, including the first signature and the second signature. Alternatively or additionally, the computer may train a classifier using images that were classified using, e.g., an unsupervised learning technique.

In this way, the computer (for example, software executed in an environment, such as an operating system, on the computer) may identify one or more fake images or fake videos. The capability may increase user trust in images or videos that they view. Consequently, the image analysis techniques may enhance the user experience and satisfaction of the users of electronic devices 110.

In some embodiments of method 200, there may be additional or fewer operations. Furthermore, there may be different operations. Moreover, the order of the operations may be changed, and/or two or more operations may be combined into a single operation.

Figure 3:
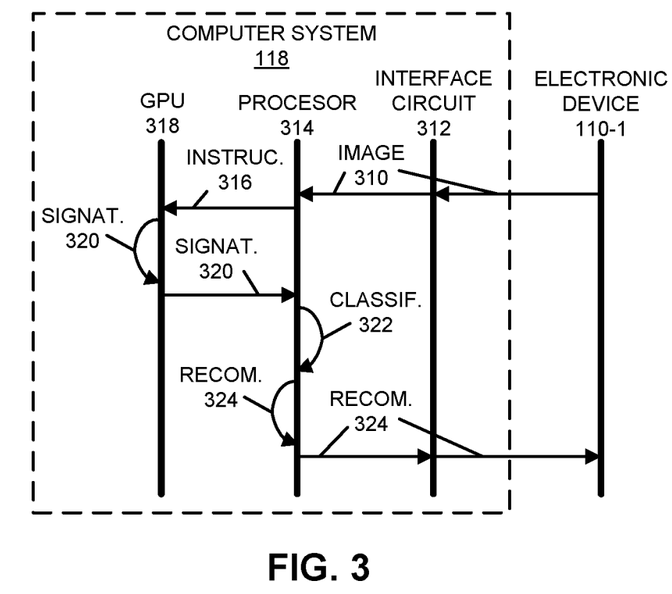
FIG. 3 is a drawing illustrating communication among components in the computer system in FIG. 1 in accordance with an embodiment of the present disclosure.

Embodiments of the image analysis techniques are further illustrated in FIG. 3, which presents a drawing illustrating communication among components in system 100 (FIG. 1). Notably, during the image analysis techniques, electronic device 110-1 may provide an image 310 to computer system 118.

After receiving image 310, interface circuit 312 in computer system 118 may provide image 310 to processor 314 in computer system 118. Then, processor 314, which executes program instructions, may instruction 316 one or more GPUs (such as GPU 318) in computer system 118 to perform analysis on image 310 to determine a signature 320 that includes one or more features in image 310. This analysis may involve the use of one or more feature extraction techniques and/or one or more neural networks.

Next, processor 314 may classify 322 image 310 based at least in part on the determined signature 320. For example, using a classifier, processor 314 may determine whether image 310 is real or fake.

Furthermore, based on classification 322, processor 314 may perform a remedial action. For example, processor 314 may determine a recommendation 324. This recommendation may be provided to interface circuit 312, which communicates recommendation 324 to electronic device 110-1. Notably, recommendation 324 may include an instruction to display a warning or a notification, or to block or filter at least a portion of the content in image 310. After receiving recommendation 324, electronic device 110-1 may perform an additional operation, such as blocking the display of image 310 when image 310 has been identified as a fake image.

While FIG. 3 illustrates unilateral communication between components, in some embodiments one or more of these communication operations involve bilateral communication.

In some embodiments, the image analysis techniques leverage inherent limitations of neural networks that are used to produce fake images or fake videos to identify a fake image or a fake video. This is illustrated in FIG. 4, which presents a drawing illustrating identification of a fake video. Notably, video 400 may include a temporal sequence of images 410 (at sequential times). Because of a finite resolution in floating point operations and/or a finite number of parameters used by a neural network that generated video 400, there may be residual artifacts in images 410 (such as frames in video 400).

For example, because of the finite resolution, filtering by a convolutional neural network that generated video 400 may result in time-variant noise when a position of an object moves or changes between neighboring or adjacent images 410. This effect may have a similar appearance to motion artifacts associated with box filtering.

Figure 4:
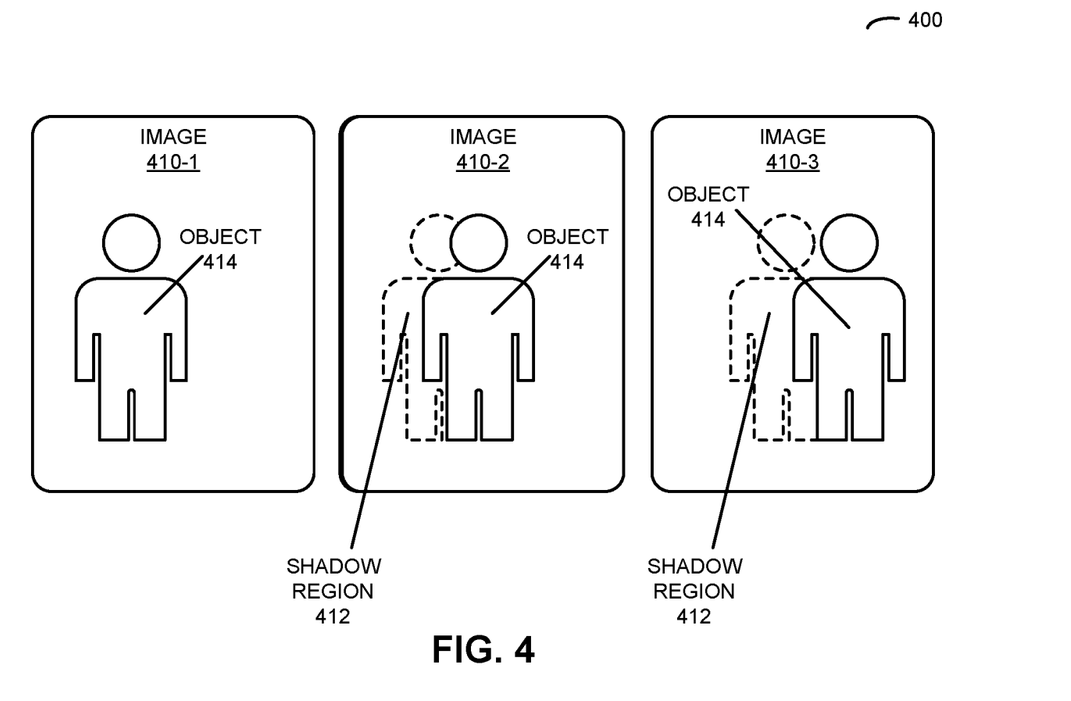
FIG. 4 is a drawing illustrating identification of a fake video in accordance with an embodiment of the present disclosure.

Therefore, as shown in FIG. 4, a first signature of a fake video may include a noise property of a shadow region 412 located proximate to and at a former position of a moving object 414 in the sequence of images 410 in video 400. For example, the noise property may include a speckled pattern of greyscale values in the shadow region 412 in a given image. Moreover, after object 414 has passed, the noise at a given location in a given image may decrease as a function of time in the sequence of images 410. In some embodiments, the noise property may include root-mean-square noise, and/or may correspond to one or more moments of a distribution. Note that the noise property may be determined using a histogram of intensity values in the shadow region 412 relative to a histogram of intensity values in one or more other regions in the given image (such as a region that is not located proximate to or at a former position of a moving object 414 in the sequence of images 410).

Furthermore, the noise property may be reduced by averaging, at the cost of a reduced resolution of image 410. Alternatively, the noise property over longer length scales may be improved by increasing the training time used by a neural network that produces a fake image or a fake video. However, the noise property may remain on a more local or short length scale (e.g., over a region that includes 10×10 pixels). Consequently, a magnification of a given image during the analysis and/or the classification in the image analysis technique may be based at least in part on how long the neural network that generated a fake image or a fake vide was trained.

Nonetheless, because the noise property is associated with what is likely an intrinsic limitation of a neural network, it may be used in some embodiments of the image analysis technique to identify a fake image or a fake video that was generated using a neural network (such as a so-called 'deep fake'). For example, the noise property may be related to (such as, an inverse function of) a size or number of layers of a neural network that produced a fake image and/or a number of processing bits used when generating a fake image. In some embodiments, the noise property exceeds an average noise level of the image by 3-20 dB in shadow region 412.

In some embodiments, one or more computer vision filters such as SIFT, a Sobel filter, HOG, etc. can be used to obtain a signature for an image. This signature could be used in a neural network and/or another machine-learning approach, such as: a support vector machine. The signature may be used to discriminate between manipulated or fake images and real images under the hypothesis that the features (or signature) detected from the one or more computer vision filters may have a different distribution for a manipulated or fake image versus a real image. Note that the one or more computer vision filters may be signal processing-based and, thus, may not be learned from training data.

While neural networks can be used to generate fake images and fake videos, as noted previously, in some embodiments the analysis and identification operations in the image analysis techniques are performed, at least in part, by a neural network (e.g., deep learning via a neural network may be used to detect a fake image or a fake video).

For example, the image analysis techniques may use one or more convolutional neural networks. A large convolutional neural network may include, e.g., 60 M parameters and 650,000 neurons. The convolutional neural network may include, e.g., eight learned layers with weights, including, e.g., five convolutional layers and three fully connected layers with a final 1000-way softmax or normalized exponential function that produces a distribution over the 1000 class labels. Some of the convolution layers may be followed by max-pooling layers. In order to make training faster, the convolutional neural network may use non-saturating neurons (such as a local response normalization) and an efficient dual parallelized GPU implementation of the convolution operation. In addition, in order to reduce overfitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional neural network may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In some embodiments, the first convolutional layer filters, e.g., a 224×224×3 input image with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with, e.g., 256 kernels of size 5×5×48. Furthermore, the third, fourth, and fifth convolutional layers may be coupled to one another without any intervening pooling or normalization layers. The third convolutional layer may have, e.g., 384 kernels of size 3×3×256 coupled to the (normalized, pooled) outputs of the second convolutional layer. Additionally, the fourth convolutional layer may have, e.g., 384 kernels of size 3×3×192, and the fifth convolutional layer may have 256 kernels of size 3×3×192. The fully-connected layers may have, e.g., 4096 neurons each. Note that the numerical values in the preceding and the remaining discussion below are for purposes of illustration only, and different values may be used in other embodiments.

In some embodiments, the convolutional neural network is implemented using at least two GPUs. One GPU may run some of the layer parts while the other runs the remaining layer parts, and the GPUs may communicate at certain layers. The input of the convolutional neural network may be, e.g., 150,528-dimensional, and the number of neurons in the remaining layers in the convolutional neural network may be given by, e.g., 253, 440-186, 624-64, 896-64, 896-43, and 264-4096-4096-1000.

Note that, with a supervised or labeled data, a few hundred images may be needed to train a neural network to identify fake media (such as a fake image or a fake vide) with 80-85% accuracy, while thousands to tens of thousands of images may be needed to train a neural network to identify fake media with 95% accuracy. Alternatively, with unsupervised or unlabeled data, a few hundred thousand images may be needed to train a neural network to identify fake media with 70% accuracy, while approximately a million images may be needed to train a neural network to identify fake media with 95% accuracy.

Therefore, in some embodiments, artificial intelligence may be used to provide a decentralized or a centralized trusted reality defender, which automatically detects a fake image or a fake video or, more generally, computer-generated content. This reality defender may provide tools that allow individuals to protect their lives, prosperity, dignity and humanity. Therefore, the reality defender may help users protect themselves against fake truth. For example, the reality defender, which may be based at least in part on deep learning, may be implemented as a Web browser plugin or a software application that can notify users of suspected deception (such as fake media) in real time. Notably, the reality defender may analyze suspected media and may provide warnings or alerts, and/or may filter out identified fake media.

We now describe embodiments of an electronic device. FIG. 5 presents a block diagram illustrating an electronic device 500, such as one of electronic devices 110, the optional base station 112, the optional access point 116 and/or computer system 118 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, one or more application-specific integrated circuits (ASICs), one or more microcontrollers, one or more programmable-logic devices, one or more GPUs and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Figure 6:
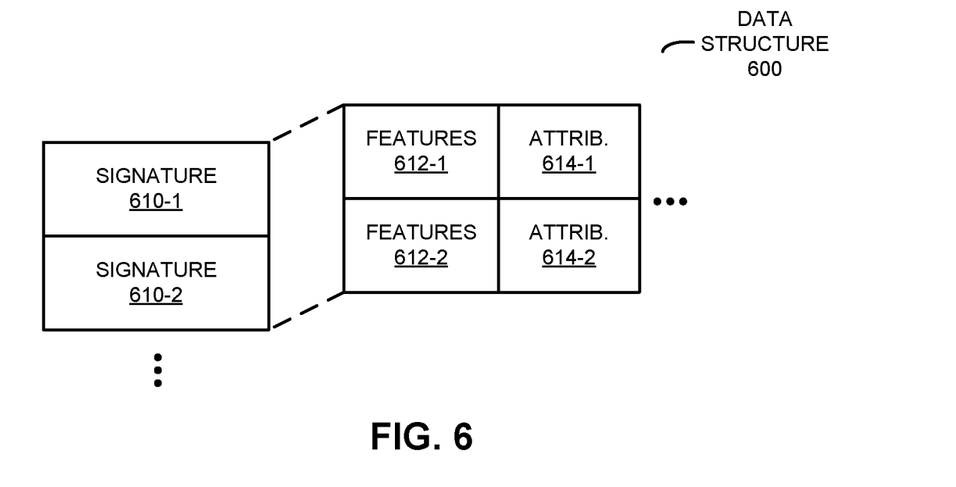
FIG. 6 is a block diagram illustrating a data structure for use in conjunction with the electronic device of FIG. 5 in accordance with an embodiment of the present disclosure.

Memory subsystem 512 may store information that is used during the image analysis techniques. This is shown in FIG. 6, which presents a block diagram illustrating a data structure 600 for use in conjunction with electronic device 500 (FIG. 5). This data structure may include multiple signatures 610 with: extracted features 612, and/or one or more attributes 614 (such as whether a given signature is associated with real or fake media).

In other embodiments, the order of items in data structure 600 can vary and additional and/or different items can be included. Moreover, other sizes or numerical formats and/or data can be used.

Referring back to FIG. 5, networking subsystem 514 includes one or more devices configured to couple to and communicate on a wired and/or wireless network (i.e., to perform network operations), including: control logic 516, an interface circuit 518, one or more antennas 520 and/or input/output (I/O) port 530. (While FIG. 5 includes one or more antennas 520, in some embodiments electronic device 500 includes one or more nodes 508, e.g., a pad, which can be coupled to one or more antennas 520. Thus, electronic device 500 may or may not include one or more antennas 520.) For example, networking subsystem 514 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a feedback subsystem 526 that provides or presents information (such as a an alert or warning associated with an image or a video, or graphical information that specifies a trustworthiness of an image or a video) to a user of electronic device 500. For example, feedback subsystem 526 may include a display subsystem that displays the information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a mainframe computer, a cloud-based computer system, a tablet computer, a smartphone, a cellular telephone, a smart watch, a headset, electronic or digital glasses, headphones, a consumer-electronic device, a portable computing device, an access point, a router, a switch, communication equipment, test equipment, a wearable device or appliance, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or feedback subsystems (such as an audio subsystem). Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program instructions 522 are included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet, Wi-Fi and a cellular-telephone communication protocol were used as illustrative examples, the described embodiments of the image analysis techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the image analysis techniques may be implemented using program instructions 522, operating system 524 (such as a driver for interface circuit 518) and/or in firmware in interface circuit 518. Alternatively or additionally, at least some of the operations in the image analysis techniques may be implemented in a physical layer, such as hardware in interface circuit 518.

While the preceding embodiments illustrated particular approaches to identifying a fake image or a fake video, in other embodiments different approaches may be used. For example, a fake video or a fake image may be identified using differentiable rendering that predicts an intermediate state that a renderer would need as an input to produce an output image or video. Notably, inconsistencies between the predicted intermediate state and an actual intermediate state may be indicative of a fake video or a fake image.

In the preceding description, we refer to 'some embodiments.' Note that 'some embodiments' describes a subset of all of the possible embodiments, but does not always specify the same subset of embodiments. Moreover, note that the numerical values provided are intended as illustrations of the image analysis techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
a computation device;
memory configured to store program instructions, wherein, when executed by the computation device, the program instructions cause the computer system to perform one or more operations comprising:
receiving an image;
classifying, based at least in part on multiple features associated with the image, the image as having a first signature associated with a fake image or as having a second signature associated with a real image, wherein the first signature corresponds to a finite resolution of a neural network that generated the fake image, a finite number of parameters in the neural network that generated the fake image, or both; and
selectively performing a remedial action based at least in part on the classification.

2. The computer system of claim 1, wherein the finite resolution corresponds to floating point operations in the neural network.

3. The computer system of claim 1, wherein the first signature corresponds to differences between the image and, given locations of one or more light sources and one or more objects in the image, predictions of a physics-based rendering technique.

4. The computer system of claim 1, wherein the computer system is configured to implement a second neural network that is configured to perform the classification.

5. The computer system of claim 4, wherein the second neural network comprises a generative adversarial network (GAN).

6. The computer system of claim 4, wherein a magnification of the image during the classification may be based at least in part on how long the neural network was trained.

7. The computer system of claim 1, wherein the image comprises a video with a sequence of images.

8. The computer system of claim 7, wherein the first signature is associated with a noise property of a shadow region located proximate to and at a former position of a moving object in the sequence of images in the video.

9. The computer system of claim 8, wherein the noise property comprises a speckled pattern of greyscale values in the shadow region in a given image in the sequence of images.

10. The computer system of claim 1, wherein the one or more operations comprise performing analysis on the image to determine the multiple features; and
wherein the analysis comprises:
a feature extraction technique that determines a group of basis features; and
selecting a subset of the basis features, which spans a space that includes the first signature and the second signature.

11. The computer system of claim 1, wherein the classification is performed using a classifier that was trained using a supervised learning technique and a training dataset with predefined signatures; and
wherein the predefined signatures comprise at least the first signature and the second signature.

12. The computer system of claim 1, wherein the classification is performed using a classifier that was trained using images that were classified using an unsupervised learning technique.

13. The computer system of claim 1, wherein the remedial action comprises one of:
providing a warning associated with the image; providing a recommendation associated with the image; or filtering at least a portion of the content in the image.

14. A non-transitory computer-readable storage medium for use in conjunction with a computer system, the computer-readable storage medium configured to store program instructions that, when executed by the computer system, causes the computer system to perform one or more operations comprising:
receiving an image;
classifying, based at least in part on multiple features associated with the image, the image as having a first signature associated with a fake image or as having a second signature associated with a real image, wherein the first signature corresponds to a finite resolution of a neural network that generated the fake image, a finite number of parameters in the neural network that generated the fake image, or both; and
selectively performing a remedial action based at least in part on the classification.

15. The non-transitory computer-readable storage medium of claim 14, wherein the finite resolution corresponds to floating point operations in the neural network.

16. The non-transitory computer-readable storage medium of claim 14, wherein the first signature corresponds to differences between the image and, given locations of one or more light sources and one or more objects in the image, predictions of a physics-based rendering technique.

17. The non-transitory computer-readable storage medium of claim 14, wherein the computer system is configured to implement a second neural network that is configured to perform the classification.

18. The non-transitory computer-readable storage medium of claim 14, wherein the image comprises a video with a sequence of images; and
wherein the first signature is associated with a noise property of a shadow region located proximate to and at a former position of a moving object in the sequence of images in the video.

19. The non-transitory computer-readable storage medium of claim 14, wherein the one or more operations comprise performing analysis on the image to determine the multiple features; and
wherein the analysis comprises:
a feature extraction technique that determines a group of basis features; and
selecting a subset of the basis features, which spans a space that includes the first signature and the second signature.

20. A method for identifying a fake image, wherein the method comprises:
by a computer system:
receiving an image;
classifying, based at least in part on multiple features associated with the image, the image as having a first signature associated with a fake image or as having a second signature associated with a real image, wherein the first signature corresponds to a finite resolution of a neural network that generated the fake image, a finite number of parameters in the neural network that generated the fake image, or both; and
selectively performing a remedial action based at least in part on the classification.

* * * * *